United States Patent Office.

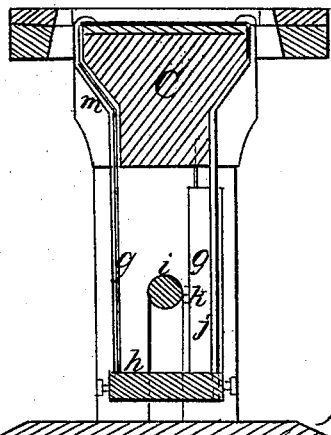
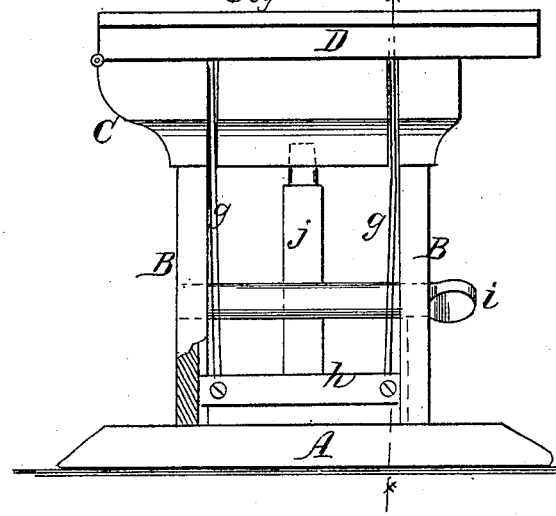
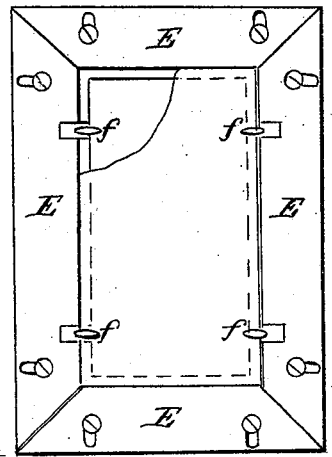

C. J. BILLINGHURST, OF McARTHUR, OHIO.

Letters Patent No. 92,694, dated July 20, 1869.

---

IMPROVEMENT IN MOUNTING PICTURES.

---

The Schedule referred to in these Letters Patent and making part of the same.

---

*To all whom it may concern:*

Be it known that I, C. J. BILLINGHURST, of McArthur, in the county of Vinton, and State of Ohio, have invented a new and useful Improvement in Mounting Pictures; and I do hereby declare that the following is a full, clear, and exact description thereof, which will enable others skilled in the art to make and use the same, reference being had to the accompanying drawing, forming part of this specification.

This invention relates to a new and useful improvement in the operation of mounting photographs and other similar pictures; and consists in the construction, arrangement, and operation of parts, as hereinafter described.

In the accompanying sheet of drawings—

Figure 1 represents a vertical section through the line $x\,x$ of fig. 2.

Figure 2 is a side elevation.

Figure 3 is a top view.

Similar letters of reference indicate corresponding parts.

A is the bed or platform, on which the machine is supported.

B B are stands, rigidly attached to the bed, upon the top of which is a block, C, on which the picture is placed in the process of mounting.

D is a frame, which is hinged to C, having upon its upper side adjustable guide-pieces E, for accommodating cards and pictures of different sizes, as seen in fig. 3.

$f$ represents hooks, which are formed on the top of the wires $g$.

At the lower end, these wires are attached to a block, $h$, which is allowed to move vertically in grooves on the inside of the stands B B.

A vertical movement of the block $h$, with the wires $g$, is produced by means of the round thumb-piece $i$, which passes through one of the stands B, while a pivot or tenon on its other end enters the other stand, so that it may be turned or revolved.

$j$ is a piece, which is attached to the block $h$, and of course moves with it.

The movement is produced by means of a pin, $k$, seen in fig. 1, in the side of the thumb-piece $i$, which enters a hole in the vertical piece $j$.

A partial revolution of the thumb-piece raises or depresses the block with the wires and hooks $f$. The object of thus operating upon the hooks is to not only raise them from the picture on the block, but to throw them laterally, or spread them so as to allow the picture to be placed on and taken from its bed. This spreading is produced by the peculiar formation of grooves in the block C, and the shape of the wires $g$.

It will be seen that as the wires are raised, their angular or inclined portions $m$ will be brought in contact with the angular or inclined grooves of the block C, and the result will be to spread the hooks. When the wires are lowered, by turning the thumb-piece the other way, the spring of the wires will throw the hooks forward over the block, as seen in fig. 1.

The operation of mounting will be readily understood from the drawing.

The picture is placed, picture-side down, on the block when the hooks are spread, where it is held by lowering the wires and allowing the hooks to spring forward over it, as seen in fig. 1. The picture is seen in red color. The picture is held in this position while the paste or gum is applied to its back. When this is completed, the card to which the picture is to be attached is placed in the rabbeted portion or recess of the frame D. The frame is then brought down over the block, and the card is brought in contact with the back of the picture. The left-hand fingers are then pressed upon the card while the thumb-piece is turned, and the hooks are withdrawn, and the mounting of the picture is completed.

With this machine, skilled operators are not required for mounting photograph-pictures. Any person of common intelligence may perform the work with the greatest accuracy and expedition.

Guide-wires may be attached to the lower block $h$, which will extend above the bed, for guiding the picture as it is placed on the bed, thus rendering it difficult to misplace a picture.

Having thus described my invention,

What I claim as new, and desire to secure by Letters Patent is—

1. The block C and the rabbeted frame D, in combination with the adjustable hooks $f$, substantially as and for the purposes herein shown and described.

2. Imparting to the hook $f$ a vertical and a lateral motion simultaneously, substantially as and for the purposes set forth.

3. The wires $g$, block $h$, thumb-piece $i$, and the vertical piece $j$, in combination with a machine for mounting photograph-pictures, arranged substantially as described.

C. J. BILLINGHURST.

Witnesses:
ELLIS B. PUGH,
JAS. M. McGILLIVRAY.